Patented Feb. 24, 1931

1,793,925

UNITED STATES PATENT OFFICE

LEO GOLDHAMMER, OF MUNICH, GERMANY, ASSIGNOR TO AGFA ANSCO CORPORATION, OF BINGHAMTON, NEW YORK, A CORPORATION OF NEW YORK

AUTOMATIC FOLDING CAMERA WITH SELF-ERECTING LENS CARRIER

Application filed August 1, 1928, Serial No. 296,722, and in Germany August 9, 1927.

The present invention relates to automatic folding cameras with self-erecting lens-carrier, more specifically to a locking device for the lens-carrier in folding cameras in which the lens-carrier together with the lens and shutter frame is brought into position for use and fixed therein by a system of levers when the hinged lid of the closed camera is brought into position to form the base of the open camera.

According to my present invention, when the lens-carrier comes into operative position it is locked by engagement at its lower part with bolts, one on each side of the base, which are brought into action by a system of levers.

Figure 1:
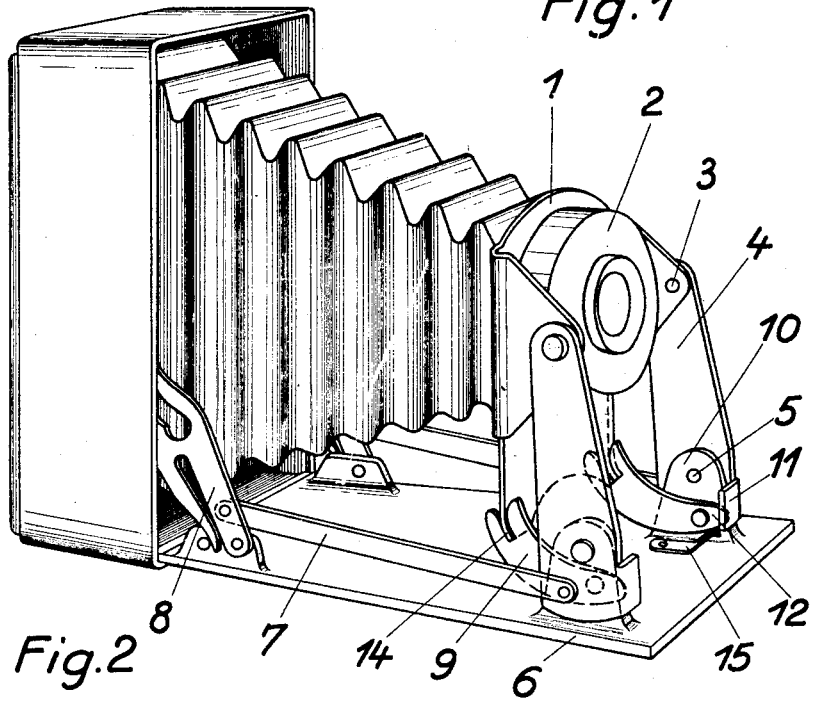
Figure 2:
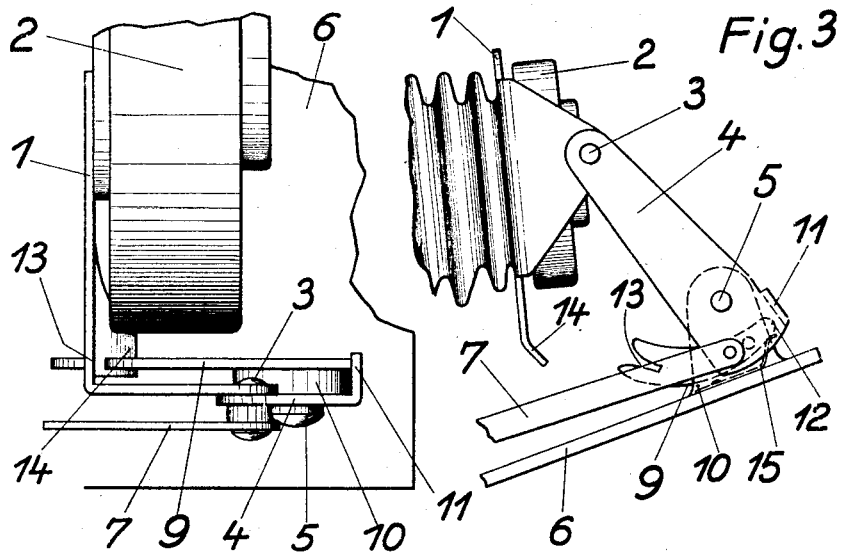
Figure 3:
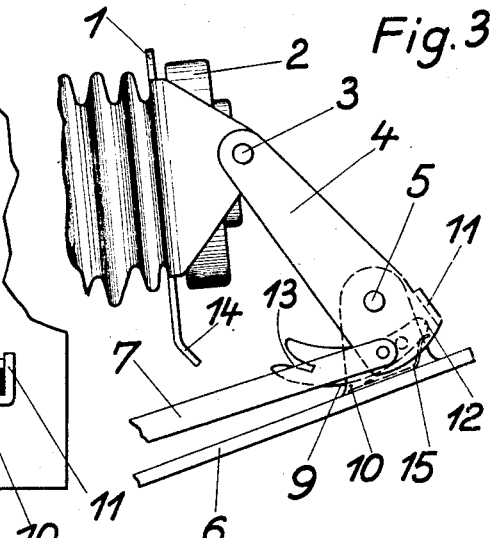
Figure 4:
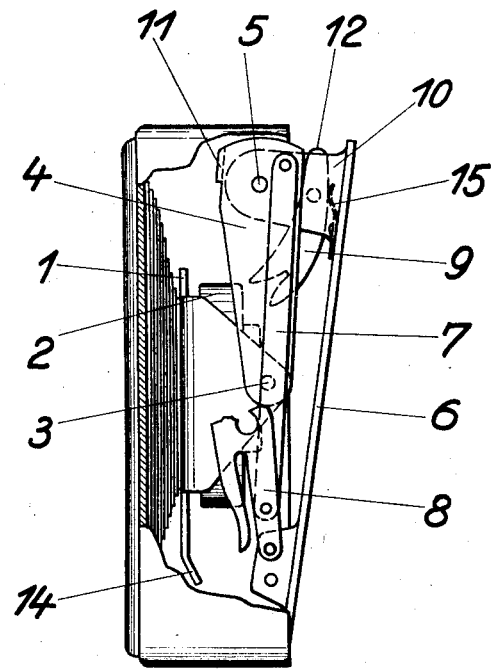

By way of example a construction according to the invention is shown in the accompanying drawings in which Fig. 1 is a perspective elevation of the open camera, Fig. 2 a part plan, Fig. 3 a part side elevation showing the position of the parts when the camera is half open, and Fig. 4 is a side elevation showing the camera nearly completely folded and in which a part of the side wall of the body and a part of the strut 8 (see Fig. 1) are omitted to show more clearly the other details of the interior camera.

The lens-carrier 1 to which is fixed a shutter frame 2 that receives the lens, is pivoted at 3 to arm 4, itself pivoted at 5 to the base 6. When the camera is open the arm 4 is erected by action of the link 7 which is pivoted at one end to the arm and at the other end to the pivoted strut 8. A member 9 is pivoted to the part 10 of the base, towards which it is pressed by a spring 15, and has an inclined tail 12 adapted to be engaged by an inwardly extending projection 11 of the arm 4. The member 9 has a notch 13 to engage the end of carrier 1 which may be bent, as shown at 14, for the purpose. The parts described are duplicated there being a set of them on each side of the base.

The operation is as follows: When the camera is opened by drawing down the base 6, the links 7 pull the arms 4 and therefore the carrier 1 towards the position for use and in the course of the movement the projections 11 depress the tails 12 of the members 9 until the notches 13 engage the carrier 1 as shown in Fig. 1. The carrier 1 is then firmly held because of the tension on the links 7.

I claim:

1. In a folding camera with self-erecting lens-carrier, in operative combination, a body having struts pivoted thereto, a base hinged to said body, a lens-carrier, supporting arms pivoted to the lens-carrier at their upper ends and at intermediate points to the base, links pivoted to the lower ends of the supporting arms and to said pivoted struts, and catches pivoted to the base and actuated by the supporting arms to engage the lower part of the lens-carrier and to maintain it in operative position.

2. In a folding camera with self-erecting lens-carrier, in operative combination, a body having struts pivoted thereto, a base hinged to said body, a lens-carrier, supporting arms pivoted to the lens-carrier at their upper ends and at intermediate points to the base, projections on the lower end of the said supporting arms, links pivoted to the lower ends of the supporting arms and to said pivoted struts, and catches pivoted to the base and actuated by the said projections of the supporting arms to engage the lower part of the lens-carrier, and to maintain it in operative position.

3. In a folding camera with self-erecting lens-carrier, in operative combination, a body having struts pivoted thereto, a base hinged to said body, a lens-carrier, supporting arms pivoted to the lens-carrier at their upper ends and at intermediate points to the base, projections on the lower end of the said supporting arms, links pivoted to the lower ends of the supporting arms and to said pivoted struts, and catches comprising members pivoted at one end to the base and being provided at the other end with notches, the said members being actuated by the projections of the supporting arms to engage with the said notches the lower part of the lens-carrier, and to maintain it in operative position.

4. A folding camera of the type having a self-erecting lens-carrier, comprising a lens, a lens-carrier, and means including a plurality of bifurcate members, operable upon the opening of said camera to operative position, to catch and hold said lens-carrier in operative position.

5. A folding camera of the type having a self-erecting lens-carrier comprising a lens, a lens-carrier, a base, a plurality of bifurcate members hinged to said base and link means operable upon the opening of said camera to rotate said bifurcate members into engagement with said lens-carrier.

6. A folding camera of the type having a self-erecting lens-carrier comprising a lens, a lens-carrier, a base, a plurality of pivoted bifurcate members, a corresponding number of members pivoted to said base for supporting said lens-carrier, each of said supporting members bearing against an end of its corresponding bifurcate member and means operable upon the opening of said camera for causing said supporting members to rotate their respective bifurcate members into engagement with said lens-carrier.

In testimony whereof, I affix my signature.

LEO GOLDHAMMER.